United States Patent [19]

Simonds

[11] 4,153,971
[45] May 15, 1979

[54] STUNNER FOR POULTRY

[75] Inventor: Michael E. Simonds, Gainesville, Ga.

[73] Assignee: Stork-Gamco, Inc., Gainesville, Ga.

[21] Appl. No.: 874,336

[22] Filed: Feb. 2, 1978

[51] Int. Cl.² .......................... A22B 3/06; A22C 21/00
[52] U.S. Cl. .......................................... 17/11; 17/1 E
[58] Field of Search .................................. 17/1 E, 11

[56] References Cited
U.S. PATENT DOCUMENTS 3,702,017  11/1972  Lewis ............................. 17/1 E X
3,918,123  11/1975  Harben, Jr. ..................... 17/1 E X Primary Examiner—Willie G. Abercrombie
Attorney, Agent, or Firm—Newton, Hopkins & Ormsby

[57] ABSTRACT

Poultry suspended heads down from an overhead conveyor are wetted with an electrolyte while adjacent to an electrolyte holding tank. At the downstream end of the electrolyte tank, a stunning trough is adjustably pivotally mounted on the tank and is comprised of a multiplicity of longitudinal electrode rods in a transversely arcuate array with the opposite ends of the rods electrically connected to arcuate buss bars secured to non-conducting trough end plates. The spaced electrode rods are in two groups which are charged alternately with opposite polarities. The stunning trough is enclosed in a non-conducting fiberglas shell to provide safety and non-conducting end caps for the stunning trough enclose and protect the buss bars and the ends of the electrode rods connected therewith.

12 Claims, 5 Drawing Figures

STUNNER FOR POULTRY

BACKGROUND OF THE INVENTION

Poultry stunning apparatuses, where birds are stunned by electrical shock in preparation for killing, are known in the prior art and examples of the patented prior art are present in U.S. Pat. Nos. 3,702,017 and 3,828,397. These prior patents are noted in this application to comply with the duty to disclose required by 37 C.F.R. 1.56.

The objective of the present invention is to improve on the known prior art by providing a poultry stunning apparatus which is more economical to manufacture, considerably safer to use, and more efficient in the operation of stunning birds to immobilize them prior to killing. The apparatus embodying the present invention is characterized by simplicity and ruggedness of construction, ease of adjustability in relation to the electrode tank, and maximum protection for the human attendant against electrical shock.

Other features and advantages of the invention will become apparent during the course of the following description.

SUMMARY OF THE INVENTION

A poultry stunning unit used in association with a tank for applying an electrically conducting liquid to birds consists of a trough-like array of electrode rods having their opposite ends electrically connected to arcuate buss bars fixedly mounted on spaced insulating end walls. An insulating shell including removable end caps encloses the exterior sides and exposed ends of the electrode rods while providing an unobstructed open top longitudinal passage for moving birds suspended heads down from an overhead conveyor. The stunning trough unit is pivoted to the downstream end of the associated electrolyte tank and includes means for adjusting the angle of the trough to increase or decrease contact of the electrode rods with the birds. Excess electrolyte is drained from the bottom of the trough back into the electrolyte tank.

DETAILED DESCRIPTION

Figure 1:
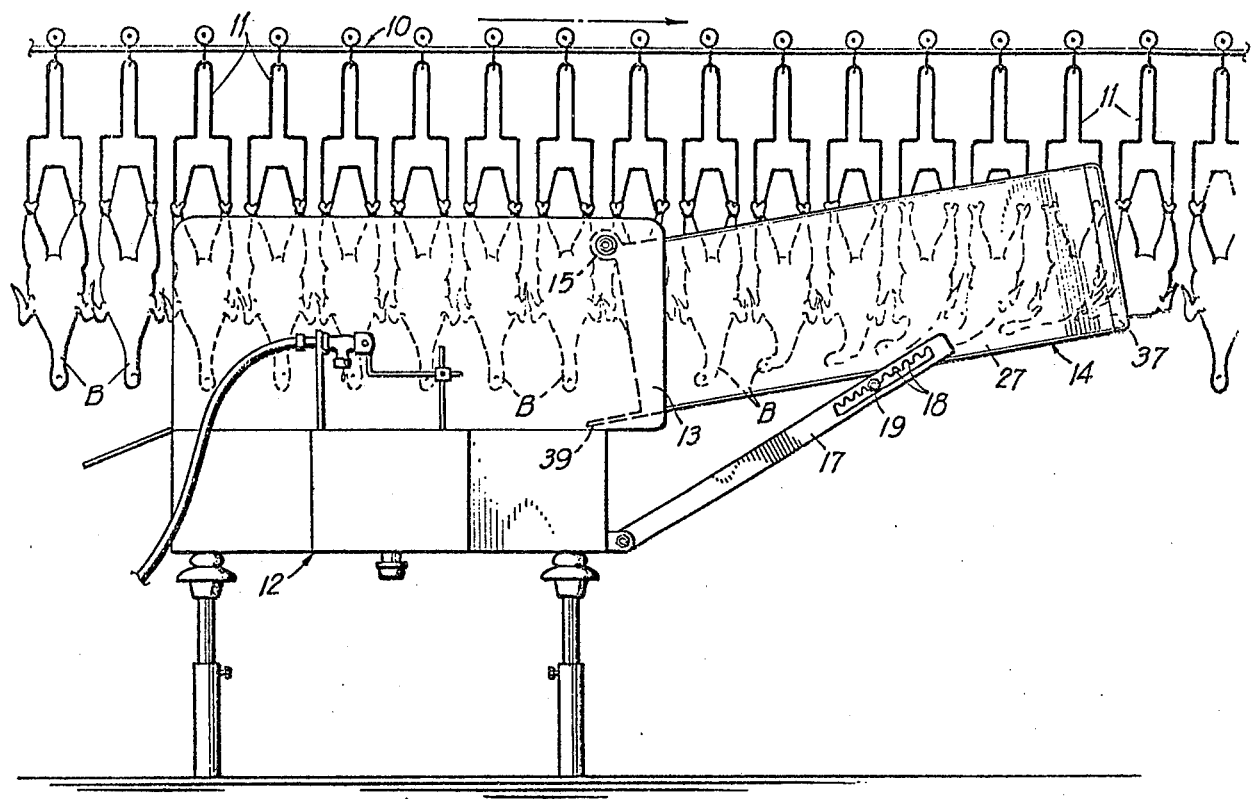
FIG. 1 is a side elevation of a poultry stunning apparatus embodying the invention.

Referring to the drawings in detail wherein like numerals designate like parts, the numeral 10 designates a conventional horizontal overhead conveyor means for birds B which are suspended heads down by their hocks from suitable shackles 11.

At an appropriate point below the conveyor means 10, a conventional liquid electrolyte tank 12 and associated electrolyte applicator means is positioned to wet the birds B with conducting fluid as they pass between side spray shields 13 of the tank 12, traveling to the right in FIG. 1. The construction of the electrolyte tank 12 and applicator means may be in accordance with the teachings of prior U.S. Pat. No. 3,828,397, above referenced. The details of the tank and applicator means, being conventional, need not be further described herein for a proper understanding of the invention.

The invention further comprises a bird stunning trough unit 14 forming the main subject matter of the invention. The trough unit 14 is positioned at the downstream end of the electrolyte tank 12 and means are provided to pivot the trough unit to the electrolyte tank and to render the angle of inclination of the trough unit adjustable in a vertical plane for the purpose of increasing or decreasing contact of the heads of birds with electrode rods on the unit 14, to be described.

Such means comprises a pair of hinge knuckles 15 on the upstream top corners of the stunning trough unit 14 attached by pivot bolts 16 and associated nuts and washers to the aforementioned side shields 13, as shown in FIG. 1. The upstream end portion of the trough unit 14, including the knuckles 15, is thus positioned between the tank shields 13 or plates.

To facilitate adjusting the inclination of the trough unit 14 through a considerable range of adjustment, pivoted struts 17 on the tank 12 at opposite sides of the trough unit 14 have longitudinal adjusting detents 18 for the selective reception of studs 19 held in brackets 20 on opposite sides of the unit 14 and at the bottom thereof near its longitudinal center.

The bird stunning trough unit 14 comprises a pair of spaced end plates 21 and 22 of electrical insulating material which are vertical and parallel in the assembly. The two plates 21 and 22 have large upwardly open arcuate recesses 23 formed therein to provide for the unobstructed passage of the birds B longitudinally through the trough unit 14. The end plates 21 and 22 are apertured at a plurality of spaced points around the acruate recesses 23 to receive the opposite end portions of plural equidistantly spaced parallel longitudinal electrode rods 24. The electrode rods are thus supported on the insulating end plates 21 and 22 and are disposed in a trough-like array.

Figure 5:
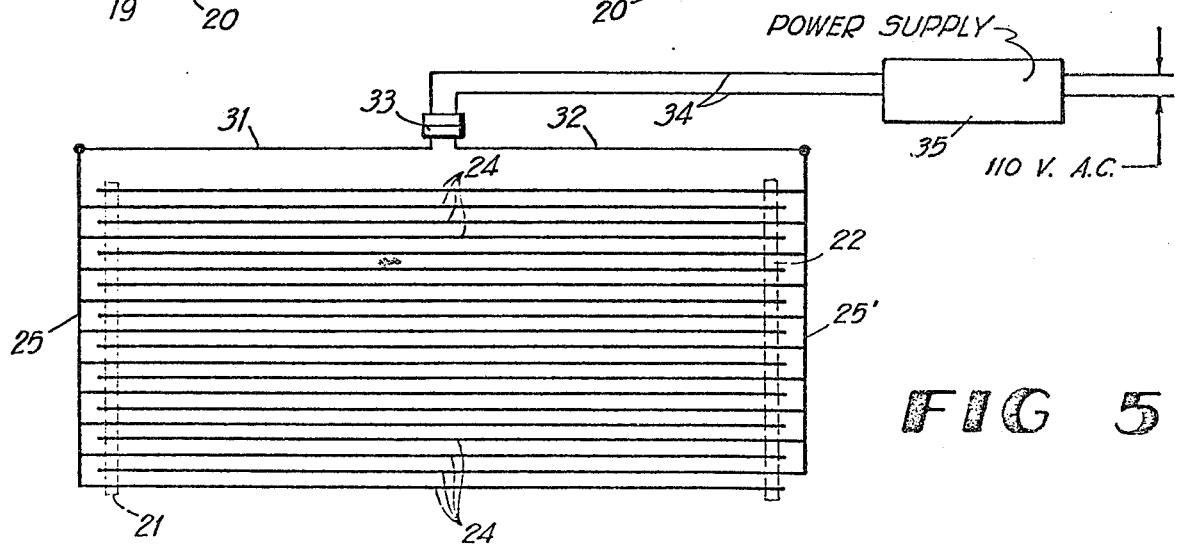
FIG. 5 is an electrical schematic showing the power supplied to rod electrodes of the stunning trough in groups of opposite polarity.

Arcuate buss bars 25 and 25' are fixedly mounted on the outer faces of the end plates 21 and 22, and at each end of the bird stunning unit 14, alternate electrode rods 24 in the trough-like array have their ends 26 electrically connected with one of the buss bars 25 or 25' so that the electrode rods are charged with opposite polarities alternately, as can be readily understood in FIG. 5. With this arrangement of alternately oppositely charged electrode rods, electrical stunning of all of the birds B as they move longitudinally through the unit 14 is assured. The heads of the birds being wet with electrolyte solution will bridge a circuit between oppositely charged rods 24 and the resulting short circuit through the bird heads will effectively stun and immobilize the bird. The desired stunning will be achieved regardless of the point in the trough-like array of electrode rods where the bird's head becomes a part of the circuit.

An important safety feature of the invention greatly reducing the likelihood of shocking a human attendant is the provision on the unit 14 of an external U-cross section non-conducting shell or casing 27 formed of fiberglas or the like and extending continuously between the outer end faces of the plates 21 and 22. The insulating shell 27 includes integral top curled beads 28 and underlying horizontal flanges 29 to provide on one side of the unit 14 a tunnel passage 30 for wires 31 and 32, FIG. 5, leading from the two buss bars 25 and 25'. The wires 31 and 32 are coupled as at 33 near the longitudinal center of the unit 14 with a power supply cable 34 leading from a suitable remote power supply 35 as depicted in FIG. 5.

The insulating shell or casing 27 additionally comprises non-conducting end caps 36 and 37 having reduced flange portions 38 which engage snugly in the ends of the shell 27 and may be secured therein with epoxy cement or the like. Thus, the insulating end caps 36 and 37 enclose and protect the buss bars 25 and 25' and the exposed terminal ends of electrode rods 24 to further reduce the likelihood of shocking a human attendant. The rods 24 are exposed only through the open top of the unit 14 between the insulating supporting end plates 21 and 22.

Figure 2:
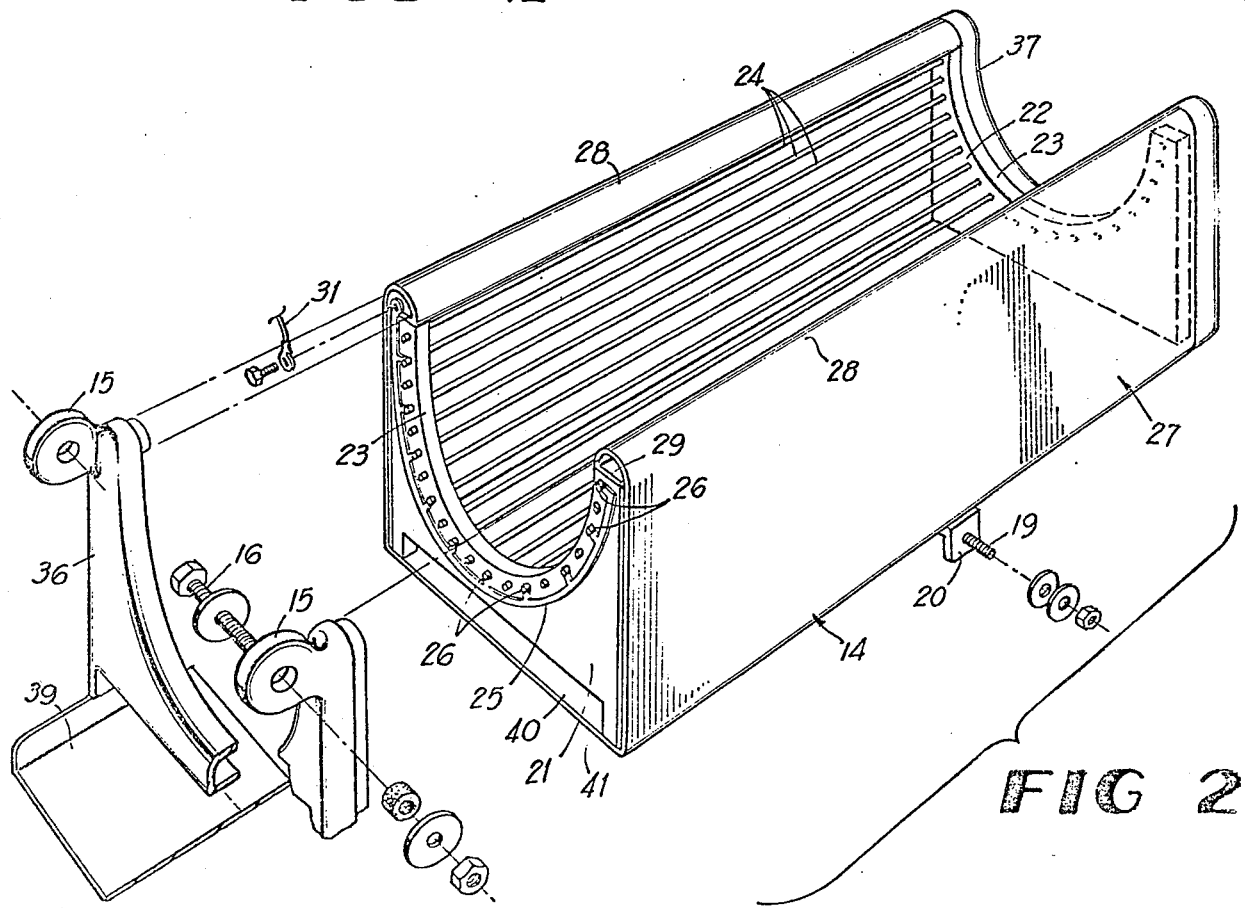
FIG. 2 is an exploded perspective view, partly broken away and partly in section, of a poultry stunning trough embodied in the apparatus.
Figure 3:
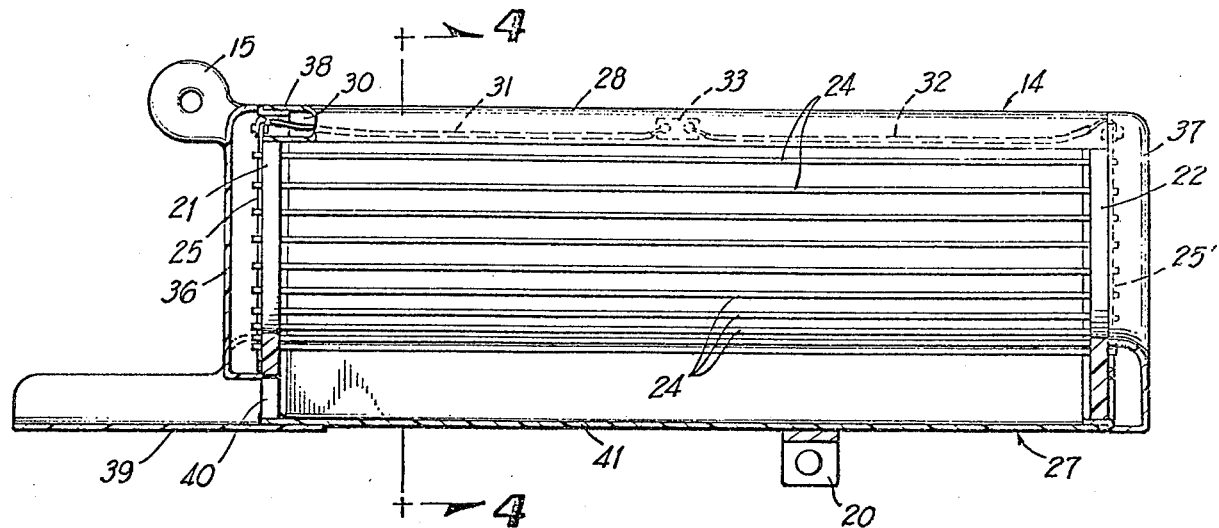
FIG. 3 is a central vertical longitudinal section through the poultry stunning trough.
Figure 4:
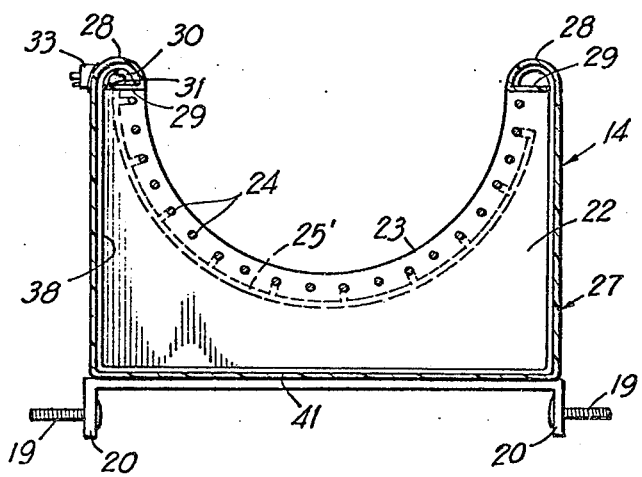
FIG. 4 is a transverse vertical section taken on line 4—4 of FIG. 3.

The previously-described hinge knuckles 15 are integrally attached to the end cap 36, FIGS. 2 and 3, and the end cap 36 also carries a drainage tray 39 at its bottom by means of which excess electrolyte from the wet birds may be returned to the tank 12. To facilitate this drainage, the adjacent end plate 21 has a bottom drainage slot 40 formed therethrough in communication with the tray 39, FIG. 3. It should be understood also that the shell or casing 27 includes a bottom wall 41 which underlies the array of rods 24 in spaced relation thereto, FIG. 4.

With the bird stunning trough unit 14 adjusted to the desired inclination, FIG. 1, the hanging birds B, after being wetted with electrolyte at the tank 12, are conveyed through the trough unit lengthwise so that their dangling heads will bridge at least one pair of the energized rods 24 having opposite polarity. When this occurs, the birds are instantly stunned and immobilized. After moving beyond the unit 14, the stunned birds are carried by the conveyor means 10 to a killing station, not shown.

The advantages of the invention over the known prior art should now be readily understood by anyone with skill in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a poultry stunning apparatus, a stunning trough unit, said unit comprising non-conducting upright end plates, buss bars secured to said end plates, plural spaced longitudinally extending electrode rods extending between the non-conducting end plates and supported thereby, alternate electrode rods having corresponding ends electrically connected with one buss bar and the remaining electrode rods having their opposite corresponding ends electrically connected to the other buss bar, power supply means electrically coupled to said buss bars, and a non-conducting shell for said stunning trough unit including non-conducting end caps covering said buss bars and adjacent exposed terminal ends of said electrode rods.

2. In a poultry stunning apparatus as defined in claim 1, and said electrode rods being disposed in an open top trough array on said unit, said end plates being apertured to receive and support opposite end portions of said electrode rods, and said buss bars being arcuate and disposed on the outer faces of the end plates and being electrically connected to said end portions of alternate electrode rods at each end of said stunning trough unit.

3. In a poultry stunning apparatus as defined in claim 2, and said non-conducting shell being trough-like and having side and bottom walls and extending between said upright end plates, said end caps being formed separately from the body portion of said shell and being secured in assembled relationship to the shell, and the shell side walls having top bead formations adapted to receive wiring leading from said buss bars.

4. In a poultry stunning apparatus as defined in claim 1, and hinge elements on said stunning trough unit at one end thereof for connecting the trough unit hingedly to an electrolyte supply tank, and adjustable means connected with the stunning trough unit for adjusting the slope of said unit in relation to an overhead bird conveyor and to an electrolyte supply tank.

5. In a poultry stunning apparatus as defined in claim 4, and said hinge elements comprising a pair of hinge knuckles on one end cap of said non-conducting shell at the top and on opposite sides thereof.

6. In a poultry stunning apparatus as defined in claim 3, and a drain tray extension on one end cap at the bottom thereof adapted to return excess electrolyte into an electrolyte supply tank with which the stunning trough unit is associated, the adjacent end plate of said unit having a drain slot in registry with said drain tray.

7. In a poultry stunning apparatus as defined in claim 1, and said upright end plates having arcuate top recesses formed therein and spanning a major portion of the width of the stunning trough unit, said electrode rods being positioned in an arcuate trough-like array along and near the margins of said end plate recesses, and said buss bars being arcuate and also extending along the margins of said recesses radially outwardly of said electrode rods.

8. In a poultry stunning apparatus as defined in claim 7, and said non-conducting shell having a substantially flat bottom wall spaced below the lowermost electrode rod of said unit and upstanding side walls spaced laterally outwardly of the topmost electrode rods of said unit, the top of said shell being open to expose the tops and interior sides of said electrode rods.

9. In a poultry stunning apparatus as defined in claim 1, and said power supply means comprising an external power supply, a coupling element on said shell adapted for connection with a mating coupling element of the external power supply, and wires leading from said buss bars to the first-named coupling element.

10. In a poultry stunning apparatus as defined in claim 9, and a top bead formation on one side of said shell forming a tunnel passage for said wires.

11. A poultry stunning unit comprising a trough-like body portion forming a longitudinal through passage for poultry suspended from an overhead conveyor, a plurality of stunning electrode rods within the interior of said body portion in spaced relationship, and means to supply an electrical potential of opposite polarity to alternate electrode rods of said plurality, whereby the heads of birds wetted with electrolyte and bridging alternate electrode rods will be stunned.

12. A poultry stunning unit according to claim 11 and wherein the electrode rods extend lengthwise of said body portion.

* * * * *